(12) United States Patent
Limonciello et al.

(10) Patent No.: US 11,106,796 B2
(45) Date of Patent: Aug. 31, 2021

(54) STAGING MEMORY FOR ACCESSORY FIRMWARE UPDATE

(71) Applicant: Dell Products L.P., Round Rock, TX (US)

(72) Inventors: Mario Anthony Limonciello, Austin, TX (US); Nicholas Diciurcio Grobelny, Austin, TX (US); Marcin Mariusz Nowak, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 248 days.

(21) Appl. No.: 16/183,652

(22) Filed: Nov. 7, 2018

(65) Prior Publication Data

US 2020/0143057 A1    May 7, 2020

(51) Int. Cl.
  *G06F 21/57* (2013.01)
  *G06F 13/42* (2006.01)
  *G06F 21/50* (2013.01)

(52) U.S. Cl.
  CPC ........ *G06F 21/572* (2013.01); *G06F 13/4282* (2013.01); *G06F 21/57* (2013.01); *G06F 21/50* (2013.01); *G06F 2213/0042* (2013.01)

(58) Field of Classification Search
  CPC ...... G06F 21/57; G06F 21/572; G06F 21/575; G06F 21/50; G06F 21/31; G06F 21/78; G06F 21/805; G06F 21/86; G06F 21/87; G06F 21/4282; G06F 21/0604; G06F 21/0659; G06F 21/0673; G06F 21/06; G06F 2213/0042
  See application file for complete search history.

(56) References Cited

U.S. PATENT DOCUMENTS

| | | | |
|---|---|---|---|
| 2006/0143600 A1* | 6/2006 | Cottrell ................. | G06F 21/572 717/168 |
| 2014/0122852 A1* | 5/2014 | Guo .......................... | G06F 9/00 713/1 |
| 2015/0186150 A1* | 7/2015 | Chung .................. | G06F 9/4411 711/103 |
| 2016/0085465 A1* | 3/2016 | Schmier ................ | G06F 3/0653 711/103 |
| 2018/0089435 A1* | 3/2018 | Zander .................. | G06F 21/575 |
| 2018/0114024 A1* | 4/2018 | Dasari ................... | G06F 21/572 |
| 2019/0147165 A1* | 5/2019 | Chen ..................... | G06F 21/572 726/22 |
| 2020/0082088 A1* | 3/2020 | Muthukumaran .... | G06F 21/572 |

* cited by examiner

*Primary Examiner* — Kristine L Kincaid
*Assistant Examiner* — Shaqueal D Wade
(74) *Attorney, Agent, or Firm* — Norton Rose Fulbright US LLP

(57) ABSTRACT

A firmware update procedure for an accessory component may use a process that stages the firmware update in a separate component from the target accessory component being updated to reduce the memory requirements in the accessory component. Security measures can be used to prevent malicious users from accessing the firmware update while stored in the staging device prior to overwrite of firmware memory in the accessory component. These security measures can include public-private key signing and cryptographic hash calculations.

18 Claims, 10 Drawing Sheets

STAGING MEMORY FOR ACCESSORY FIRMWARE UPDATE

FIELD OF THE DISCLOSURE

The instant disclosure relates to information handling system. More specifically, portions of this disclosure relate to firmware updates involving the information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may connect to accessory devices that include their own firmware. Such an accessory may include, but is not limited to, a docking station, disc drive, memory drive, graphics card, audio card. Firmware may refer to any code intended for execution by the accessory for operating the accessory component. As shown in FIG. 1, an information handling system (IHS) 110 coupled to an accessory 120 over a bus. The accessory may be internal or external to the IHS 110. The accessory 120 includes memory 122, such as non-volatile memory (NVM), which stores the firmware. Conventionally, a firmware update is performed by copying the firmware update into the memory 122 alongside the current firmware. The accessory 120 then switches to using the firmware update while the current firmware, or another backup firmware, remains in the memory 122. During the firmware update a redundant copy, whether the current firmware or other backup firmware, remains available in case the firmware update fails. This conventional technique provides resiliency but requires at least double the memory 122 in the accessory 120 in order to store two copies of firmware.

SUMMARY

The firmware update procedure for accessory components may be improved by using a process that stages the firmware update in a separate component from the target accessory component being updated. This reduces the memory requirements in the accessory component. Staging the update in a separate component can pose security risks, such as by allowing the staged firmware update from being maliciously modified prior to updating the accessory from the staged memory. Techniques described herein reduce or eliminate that risk of malicious modification of the staged firmware update prior to flashing the firmware on the component. Furthermore, techniques described herein reduce or eliminate the risk of a malicious erase command erasing the firmware of the accessory in an attempted denial of service (DoS) attack.

According to one embodiment, a firmware update procedure that achieves at least some of the benefits described herein includes loading a firmware update from an information handling system to a staging device for update of an accessory component. Next, the memory of the staging device is locked to prevent further modification. Then, the authenticity of the firmware update in the staging device is verified. If the firmware payload, such as a binary payload or code to be loaded on the component, is verified, then the firmware of the accessory component is updated with the firmware payload by overwriting the current firmware. The overwrite of the current firmware in the accessory may be performed in some embodiments without having an existing backup or redundant copy of firmware for the accessory component in the accessory component's memory.

In certain embodiments, a firmware update procedure may include receiving, by a first component having a first memory storing an original firmware, an instruction to verify a firmware payload for the first component stored in a second memory of a second component; locking, by the first component, the second memory of the second component from modification; determining, by the first component, whether the firmware payload is verified; and when the firmware payload is verified, updating the first memory with the firmware payload stored in the second memory by overwriting the original firmware.

In certain embodiments, the step of determining whether the firmware payload was verified may include instructing the second component to compute a cryptographic hash value for the firmware payload stored in the second memory; the step of determining whether the firmware payload was verified may include comparing the cryptographic hash value computed by the second component with an expected hash value for the firmware payload; the step of receiving the instruction to verify the firmware payload may include receiving an instruction from a docking component; the step of updating the first memory with the firmware payload may include retrieving the firmware payload from the second memory over a first bus having a lower bandwidth than a second bus used to store the firmware payload in the second memory; and/or the update procedure may include verifying, by the first component, the firmware payload stored in the first memory after updating the first memory.

According to another embodiment, an apparatus may include an information handling system; a first component coupled to the accessory component, the first component having a first memory; and/or a second component coupled to the first component, the second component having a second memory. The second component may be configured to perform steps according to the firmware update techniques described herein. For example, the second component may be configured to perform steps including receiving an instruction to verify a firmware payload for the first component stored in the first memory of the first component; locking the first memory of the first component from modification; determining whether the firmware payload is verified; and/or when the firmware payload is verified, updating the second memory with the firmware payload stored in the first memory by overwriting an original firmware stored in the second memory.

In some embodiments, the method may further include instructing the second component to compute a cryptographic hash value for the firmware payload stored in the second memory; comparing the cryptographic hash value computed by the second component with an expected hash value for the firmware payload; receiving an instruction from a docking component; verifying, by the first component, the firmware payload stored in the first memory after updating the first memory; and/or retrieving the firmware payload from the second memory over a first bus having a lower bandwidth than a second bus used to store the firmware payload in the second memory.

According to another embodiment, an apparatus may include an information handling system, a first component coupled to the dock component, the first component having a first memory, and/or a second component coupled to the first component, the second component having a second memory. The second component may be configured to perform steps comprising receiving an instruction to verify a firmware payload for the first component stored in the first memory of the first component; locking the first memory of the first component from modification; determining whether the firmware payload is verified; and/or when the firmware payload is verified, updating the second memory with the firmware payload stored in the first memory by overwriting an original firmware stored in the second memory. The steps performed by the second component may also or alternatively include any of the steps described herein regarding the method.

According to a further embodiment, an information handling system may include a first bus coupled to a first component, wherein the information handling system is coupled to a second component through a second bus between the first component and the second component. The information handling system may be configured to perform steps including storing a firmware payload in a first memory attached to the first component, wherein the firmware payload is intended for the second component; and/or transmitting an authenticate command to the second component. The step of transmitting the authenticate command may cause installation of the firmware payload in the second component by causing the second component to retrieve the firmware update from the first component according to, for example, the steps described herein.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Figure 1:
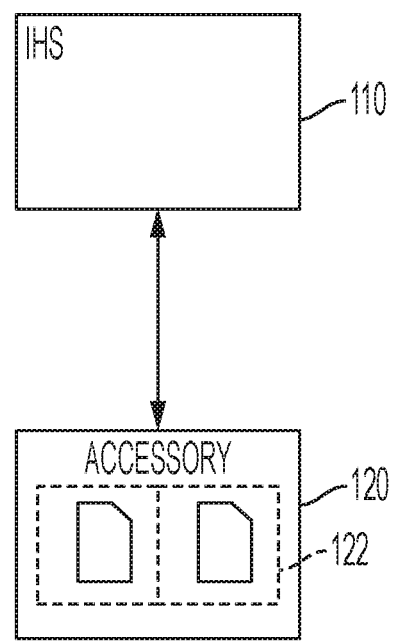
FIG. 1 is a block diagram illustrating a conventional accessory component attached to an information handling system.
Figure 2A:
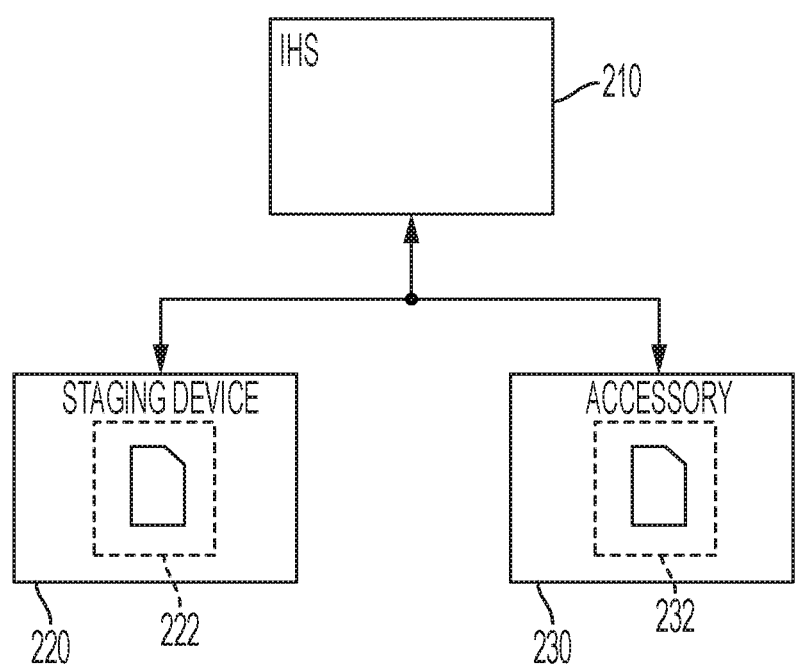
FIGS. 2A-B are block diagrams illustrating a system for staging a firmware payload during a firmware update procedure according to some embodiments of the disclosure.
Figure 2B:
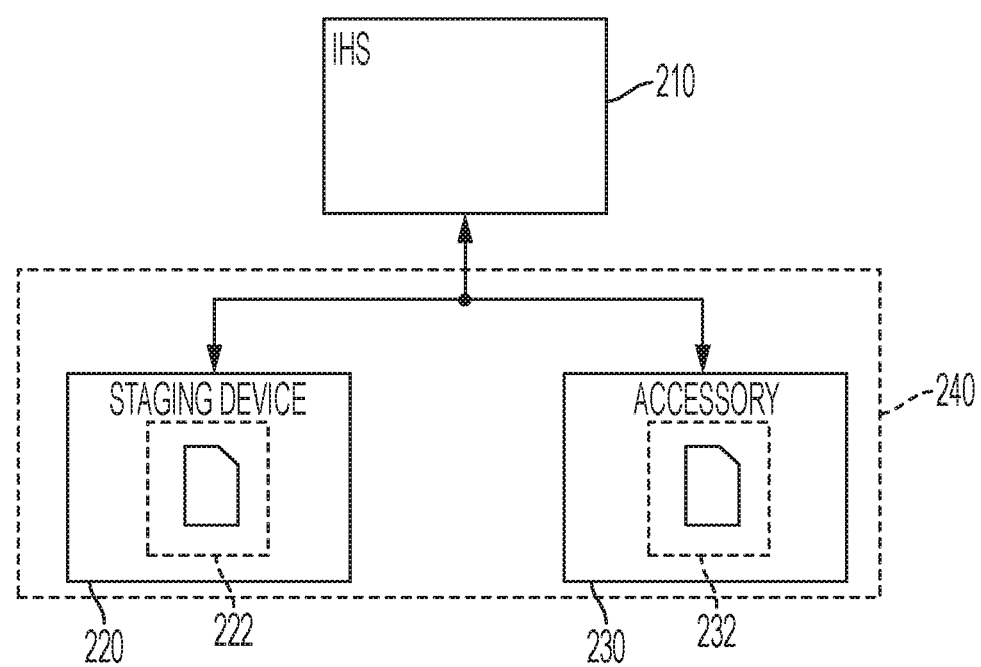

FIG. 2A is a block diagram illustrating a system for staging a firmware payload during a firmware update procedure according to some embodiments of the disclosure. An information handling system 210 may be coupled to a staging device 220 and an accessory 230 through a bus. Although a single shared bus is shown in FIG. 2, different bus configurations, including multiple busses, may be used to transfer commands and firmware payloads between components. The staging device 220 may include a memory 230 for storing a firmware payload. The accessory component 230 may include a memory 232 for storing a current firmware used by the accessory component 230. Although the memory 232 of the accessory component 230 may be larger than the size of the firmware payload, the accessory component 230 may be restricted to storing a single copy of firmware, such that the accessory component 230 does not have a backup or redundant copy of firmware available to fall back to in the case of a firmware update failure. Examples of accessory components include an embedded controller (EC), a USB-C docking station, a thunderbolt controller (TR), a USB-C device for power management (CCG2), a Gen-1 USB hub, a Gen-2 USB hub, and a switching device for multi-stream transport (MST-Hub). In another embodiment shown in FIG. 2B, the accessory component and staging device may be part of the same physical larger device or component. For example, device 240 may include staging device 220 and accessory component 230. In some configurations, the staging device 220 and accessory component 230 may share a bus to the IHS 210. In some configurations, the accessory component 230 may be coupled through a bus to the staging device 222, which is coupled to the IHS 210 through a different bus.

Figure 3:
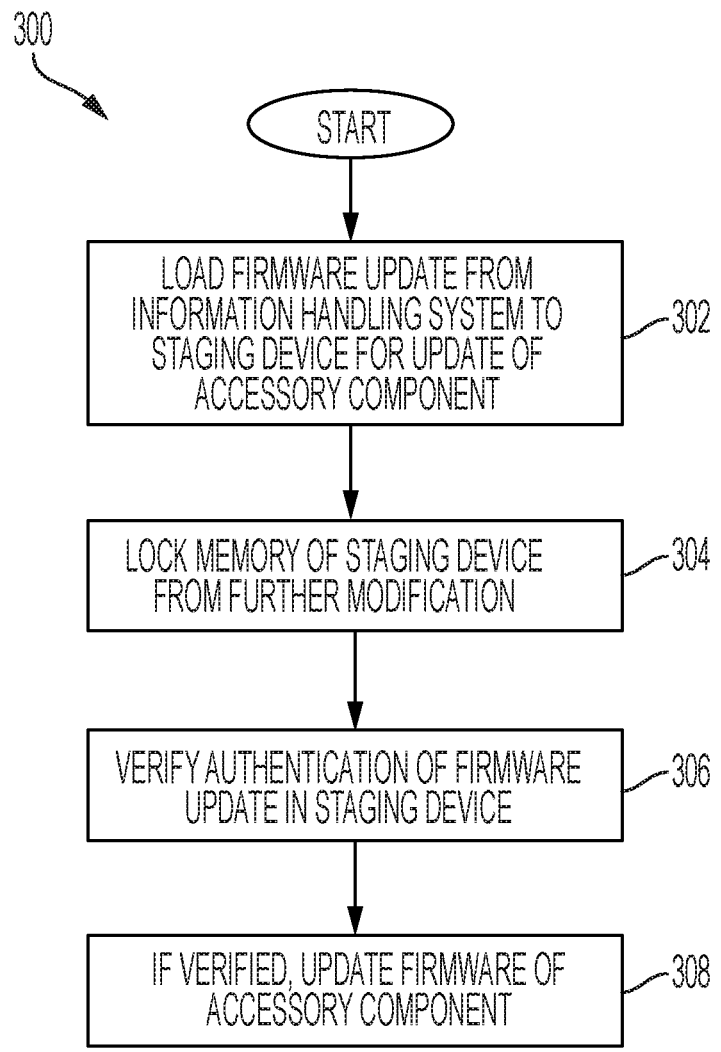
FIG. 3 is a flow chart illustrating a method of updating firmware of an accessory component using a staging device according to some embodiments of the disclosure.
Figure 4A:
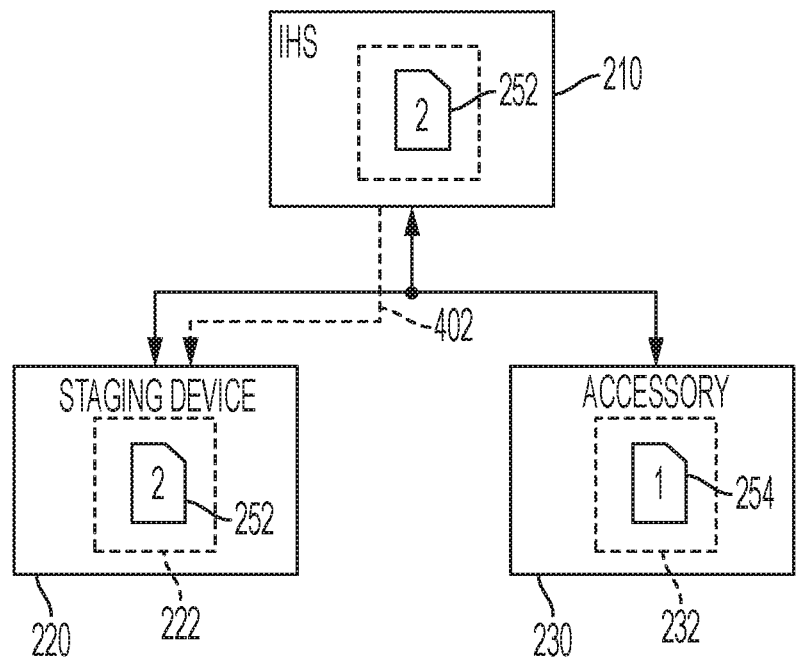
FIGS. 4A-E shows block diagrams illustrating steps of the firmware update process using a staging device according to some embodiments of the disclosure.

A method for updating the firmware of the accessory component is shown in the flow chart of FIG. 3 and accompanying FIGS. 4A-E. A method 300 begins at block 302 with loading a firmware payload from an information handling system (IHS) to a staging device for update of an accessory component. The staging device may be internal or external to the IHS and internal or external to the accessory component. In one embodiment, the accessory component and the staging device may both be USB devices coupled to the IHS through a USB bus. FIG. 4A shows the loading of the firmware payload to a staging device. Information handling system (HIS) 210 transfers 402 firmware payload 252 to memory 222 of staging device 220. During staging of the firmware payload 252, accessory component 230 includes memory 232 storing the current firmware 254. The memory 232 of the accessory component 230 may be insufficient to store the firmware payload 252 and the current firmware 254 simultaneously.

Figure 4B:
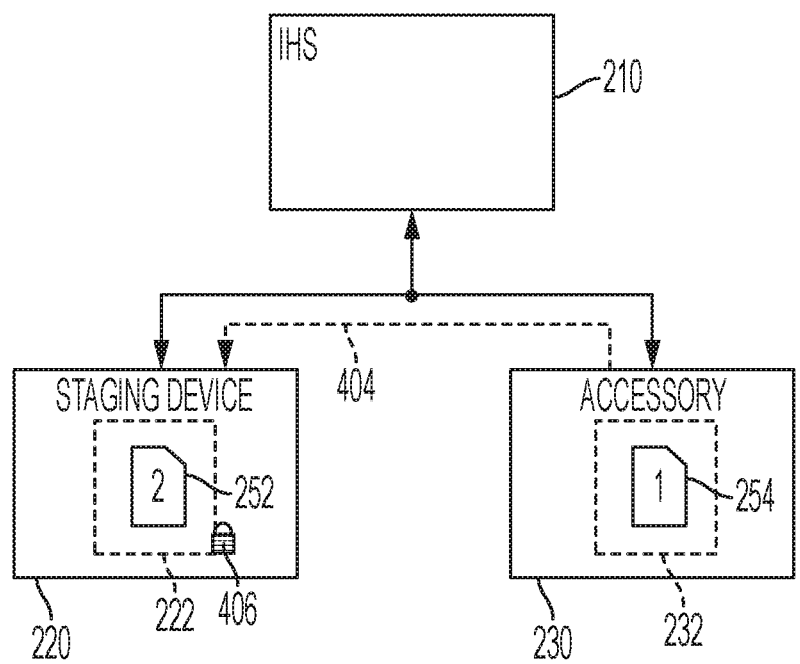

Referring back to FIG. 3, at block 304 the memory of the staging device is locked from further modification. FIG. 4B shows locking of the staging device memory. Lock 406 is applied to the memory 222 of staging device 220. The lock 406 may be a read-only attribute or similar attribute stored inside a firmware of the staging device 220. Other example locking mechanisms may include encryption, with protection of the encryption key such that allowing access to the key for decryption accomplishes the locking. The lock 406 prevents further modification of the firmware payload 252 stored in memory 222. The locking step prevents malicious or accidental modification of the firmware payload 252. Preventing malicious modification of the firmware payload 252 prevents unauthorized individuals from obtaining access to accessory component 230 after the firmware payload 252 is installed on the accessory component 230. Depending on the type of component of accessory component 230, an unauthorized individual may be able to obtain access to usernames and passwords or encrypted file by maliciously modifying the firmware payload 252 in staging device 220. The lock 406 also prevents accidental modification of the firmware payload 252 such as through accidental access to the memory 222 by other components. Thus, the lock 406 improves security during the firmware update process.

Figure 4C:
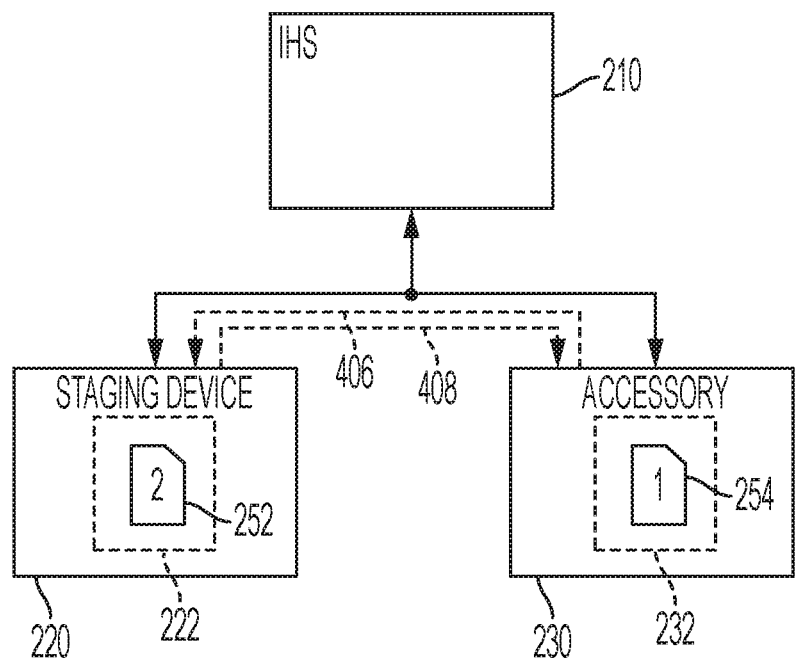

Again, referring back to FIG. 3, the authenticity of the firmware payload in the staging device is next confirmed at block 306. FIG. 4C shows verification of the firmware payload according to some embodiments. The accessory component 230 may instruct the staging device 220 to perform verification on the firmware payload 252 with request 406. The staging device 220 may verify the firmware payload 252, such as by computing a cryptographic hash (SHA) of the firmware payload 252 using algorithms such as SHA1, SHA2, MD5, or another cryptographic hash. The hash value may be returned 408 to the accessory component 230 for verification. The accessory component 230 may previously have received an expected cryptographic hash value to which the accessory component 230 can compare the calculated cryptographic hash value of the firmware payload 252. The accessory component 230 can confirm the veracity of the firmware payload 252 when the hash values match. If the firmware payload 252 has been modified, either maliciously or accidentally, the hash values will not match. When the hash values do not match, the accessory component 230 may notify the information handling system (IHS) 210 of the update failure. The IHS 210 may then log the error and/or restart the update process of FIG. 3 by again copying the firmware payload 252 into the memory 222 of the staging device 220.

Figure 4D:
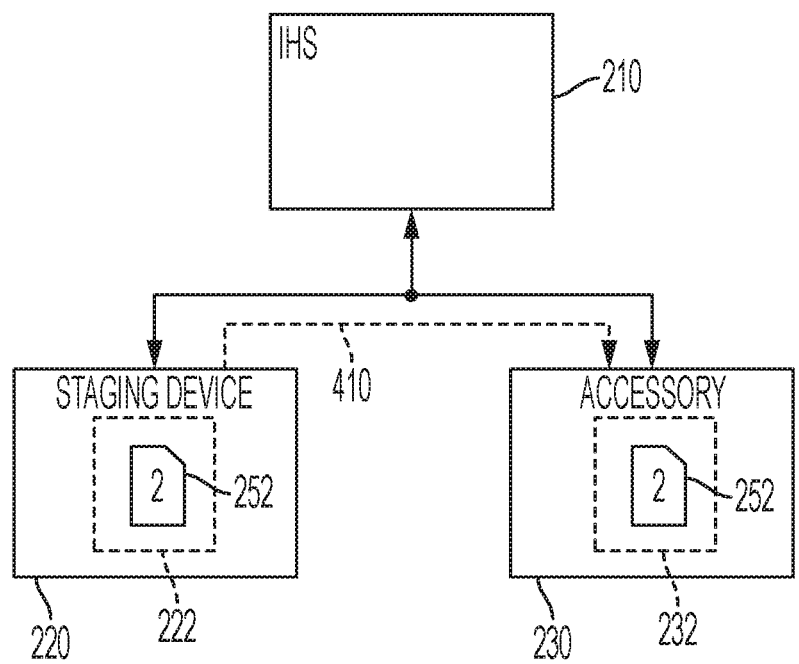
Figure 4E:
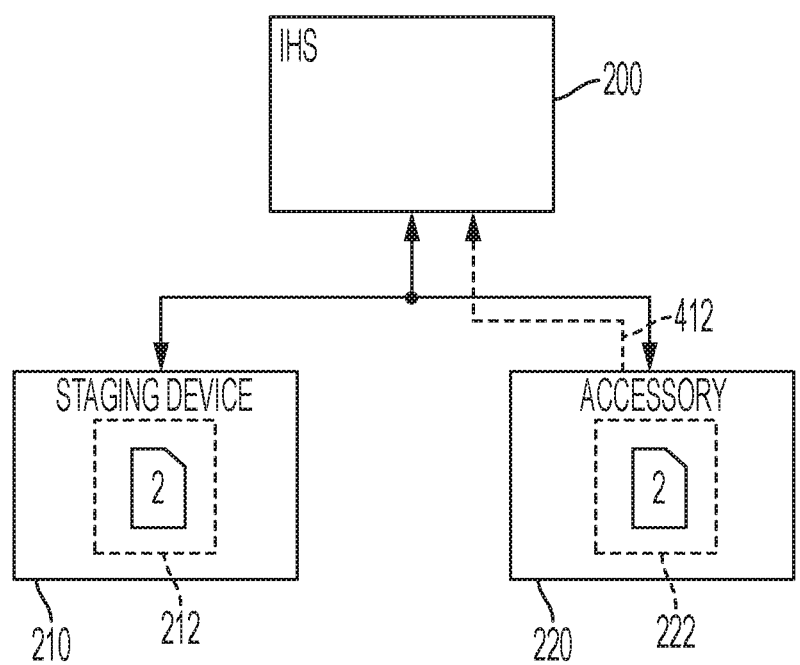

When the firmware payload 252 is verified, such as by matching the expected and computing hash values, the firmware update process of method 300 may continue. At block 308, the firmware of the accessory component is updated using the firmware payload stored in the staging device. FIG. 4D shows the firmware payload from the staging device according to some embodiments. The firmware payload 252 is copied 410 to the memory 232 of the accessory component 230, where the current firmware 254 is overwritten. The accessory component 230 may perform another verification of the installed firmware payload 252 to verify the update process completed successfully. The success result 412 may be returned to the information handling system (IHS) 210. FIG. 4E shows the result returned to the information handling system according to some embodiments. If the update fails, the IHS may take steps to again perform the firmware update procedure of method 300 or perform a recovery procedure on the accessory component 230.

Figure 5:
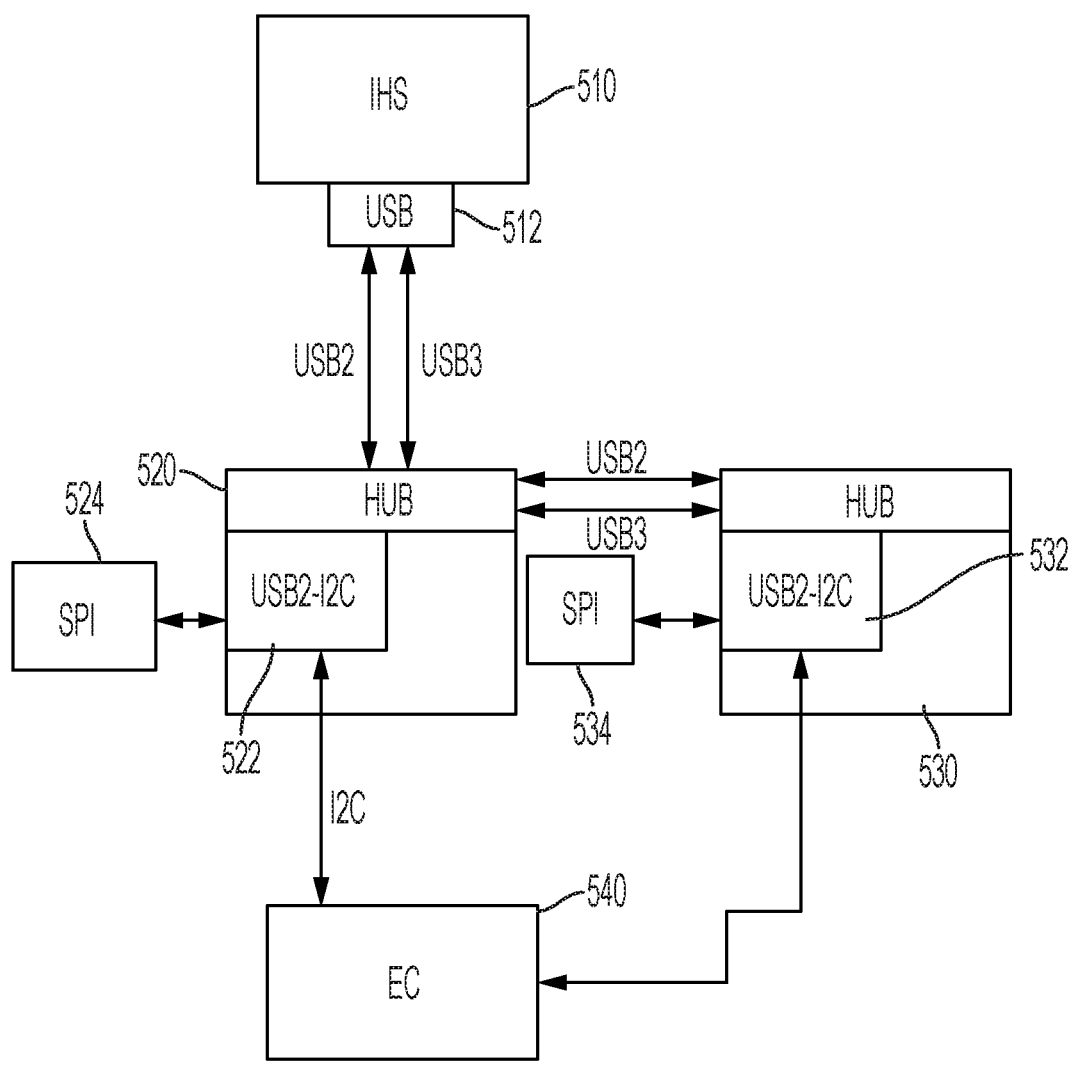
FIG. 5 is a block diagram showing illustrating a system with disparate busses connecting a staging device to an accessory component according to some embodiments of the disclosure.

One embodiment of the staged firmware update described herein may be performed in a system with disparate busses interconnecting the information handling system (IHS), the staging device, and the accessory component. FIG. 5 is a block diagram showing illustrating a system with disparate busses connecting a staging device to an accessory component according to some embodiments of the disclosure. An information handling system (IHS) 510 may have a USB interface 512 for connecting to a USB hub 520 over Universal Serial Bus (USB) 2.0, USB 3.0, or any earlier or later developed USB standard. The hub 520 may include a USB-Inter-Integrated Circuit (I2C) interface 522 that couples the USB hub 520 to an I2C bus coupled to other components such as an embedded controller (EC) 540. The hub 520 may also be coupled through a USB bus to a Serial Peripheral Interface (SPI) memory 524 (e.g., flash memory). The USB hub 520 may also be connected to another USB hub 530. The USB hub 530 may have a USB2-I2C interface 532 to components such as the embedded controller (EC) 540. The USB hub 530 may also be coupled through a USB bus to a SPI memory 534. The USB hub 520 may operate as a staging device for firmware updates to the EC 540. The IHS 510 may load a firmware payload into the SPI memory 524 of the USB hub 520. The IHS 510 may then instruct the EC 540 to perform a firmware payload from the SPI memory 524, and execute the method 300 of FIG. 3. In some embodiments, the hubs 520 and 530 may be different generation USB hubs, such as when USB hub 520 is a Gen2 hub and USB hub 530 is a Gen1 hub. Each illustrated component may be either a staging device or an accessory component depending upon its role in the firmware update. For example, the USB hub 530 may serve as a staging device for a firmware update of the EC 540. In another example, the USB hub 520 may serve as a staging device for a firmware update of the USB hub 530.

The use of the staged firmware update procedure described herein may improve the speed of the firmware update process in addition to improving the security of the firmware update process. For example, as shown in FIG. 5 the accessory component is connected to the IHS through an I2C bus, which is slower than the USB bus. Thus, limiting the number of transfers of the firmware payload over the I2C bus can improve the speed of the firmware update process. A USB hub used as a staging device has an USB connection to the IHS. The USB connection is faster than the I2C bus, and thus the firmware payload can be transferred quicker into the USB hub staging device. If there are any errors in the firmware payload after the transfer, re-transferring the firmware payload into the USB hub is a faster process than if the firmware payload had to be uploaded again to the accessory component over the I2C bus. Additionally, the staging device may have a faster connection to its attached memory than the accessory component has to its attached memory. For example, SPI memory attached to a USB hub may have faster transfer rates and access times than memory attached to the accessory component. With faster memory, the staging device can more quickly perform verification of the firmware payload than the accessory component. Thus, one advantageous use of the firmware update process described herein is in a system having a first bus coupling the IHS (or other source of the firmware payload) to the staging device and a second bus coupling the staging device to the accessory component being update.

Keys may be used as part of the verification of the firmware payload prior to flashing of the accessory component memory. For example, the expected cryptographic hash value may be signed by a private key stored on the information handling system (IHS) or stored outside of the accessory component, such as on a private signing infrastructure. The accessory component may have a public key corresponding to the private key that is used to decrypt the expected cryptographic hash value. This encryption of the expected cryptographic hash value improves the security of the firmware update procedure by preventing a malicious user from modifying the firmware payload while in the staging device and intercepting delivery of the expected cryptographic hash value and inserting its own expected value. The use of the public-private key infrastructure in this manner reduces the likelihood that a malicious user can take control of the accessory component during the firmware update procedure. Although encryption of the expected cryptographic hash value is described, any data used by the accessory component may be encrypted for delivery to the accessory component during the firmware update procedure.

Figure 6:
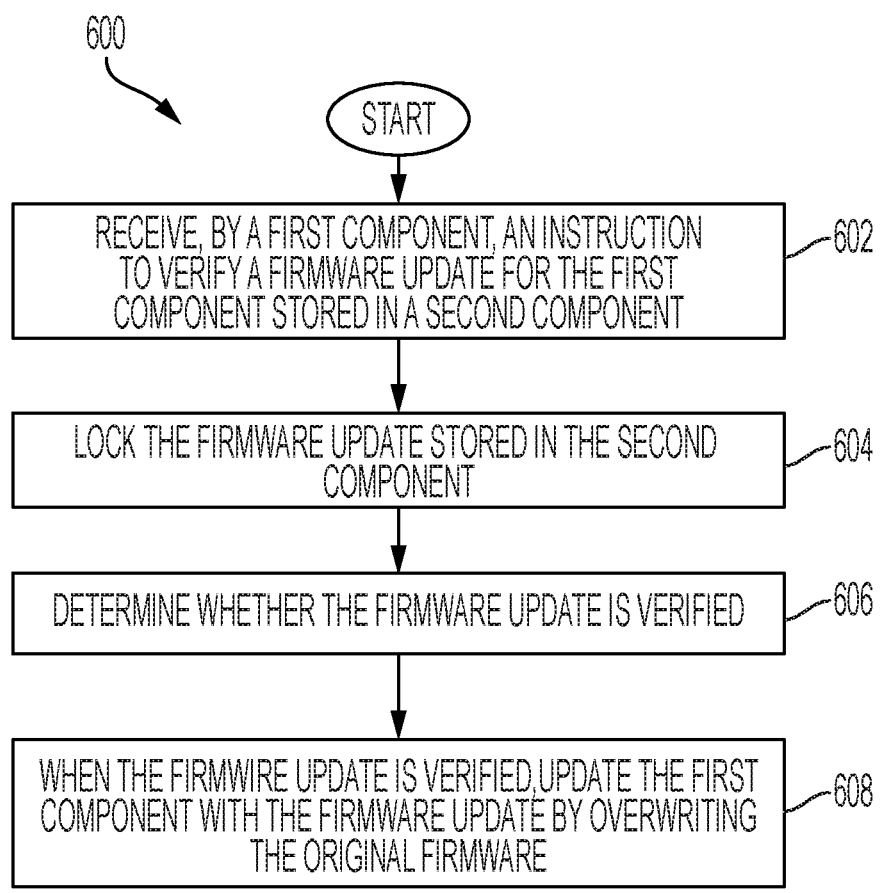
FIG. 6 is a flow chart illustrating a firmware update procedure for an accessory component according to some embodiments of the disclosure.

A method performed by the accessory component receiving a firmware payload as part of the staged firmware update process, described for example in FIG. 3, is shown in FIG. 6. FIG. 6 is a flow chart illustrating a firmware update procedure for an accessory component according to some embodiments of the disclosure. A method 600 may begin at block 602 with receiving, by a first component (e.g., the accessory component receiving a firmware payload), an instruction to verify a firmware payload for the first component with the firmware payload being stored in a second component (e.g., a staging device such as a USB hub with SPI memory). The instruction may be received from the IHS or another component. In some embodiments, the accessory component may be locked to only receive firmware update instructions from certain master components such as the IHS. At block 604, the first component then locks the firmware payload stored in the second component. At block 606, the first component determines whether the firmware payload is verified. This determination may include, for example, comparing an expected cryptographic hash value with a calculated cryptographic hash value. Next, at block 608, when the firmware payload is verified the first component is updated with the firmware payload by overwriting the current firmware.

After overwriting memory with the firmware payload, the accessory component may perform a verification of the installed firmware payload. If the firmware update has failed, the accessory component may repeat the process of FIG. 6 without again contacting the IHS to attempt recovery from the firmware update failure. In one example operation, the recovery process may be used to recover from power failures during the firmware update process. In some embodiments, the staging device may store two images for a firmware payload, with one image being the firmware payload and the second image being a recovery firmware. After a specified number of failures in the firmware update process the accessory component may retrieve the recovery firmware to prevent interruptions in services involving the accessory component.

Figure 7:
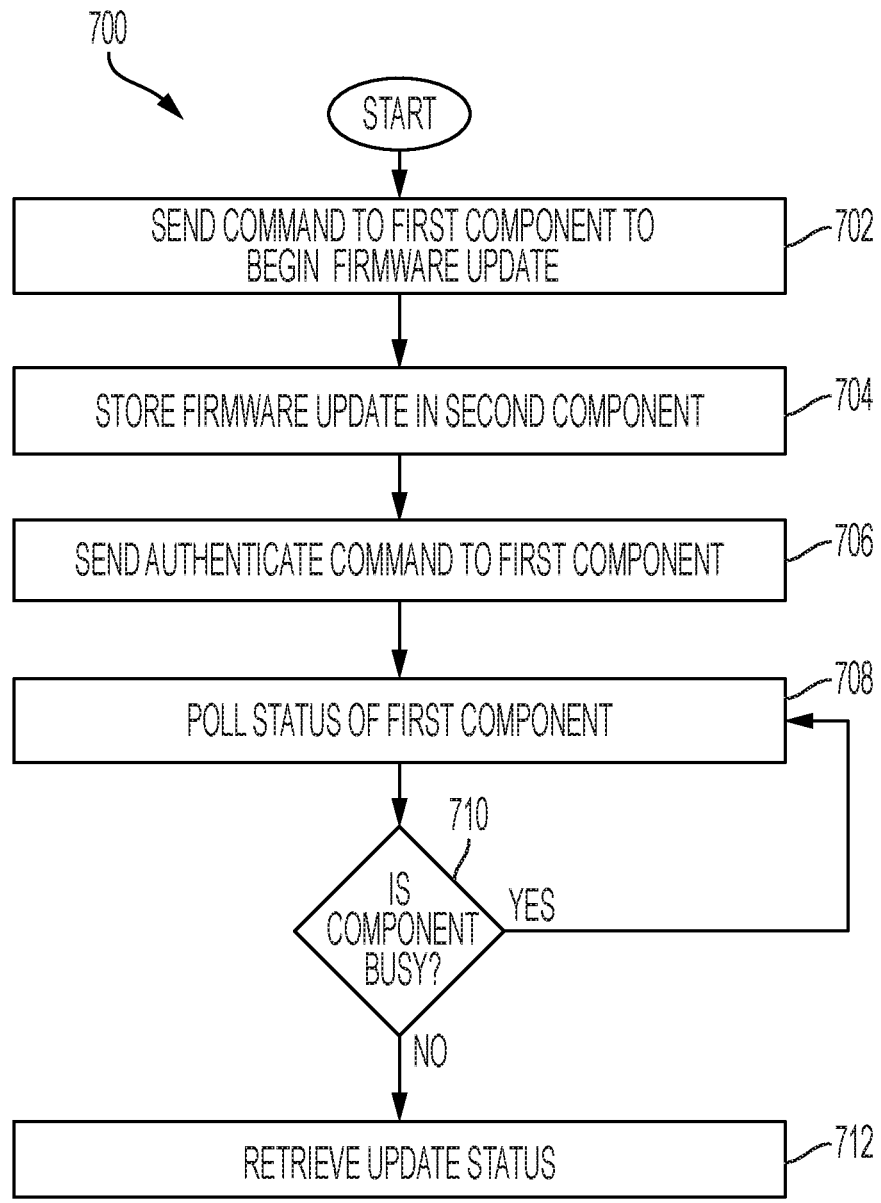
FIG. 7 is a flow chart illustrating a firmware update procedure executed by an information handling system according to some embodiments of the disclosure.

A method performed by the information handling system (IHS) for performing a firmware update of an accessory component is shown in FIG. 7. FIG. 7 is a flow chart illustrating a firmware update procedure executed by an information handling system according to some embodiments of the disclosure. A method 700 begins at block 702 with sending a command to a first component (e.g., an accessory component) to begin a firmware update. The update command may release write access to a second component (e.g., staging device) to receive the firmware payload for staging. At block 704, the IHS stores a firmware payload in the second component (e.g., a staging device such as a USB hub with SPI memory). At block 706 an authenticate command is sent to the first component. The authenticate command may be, for example, contained in a message, and that message may be a symmetric key (shared secret), a asymmetric key challenge-response method, or a message authentication code (MAC) using any cryptographic MAC form, such as HMAC. This authenticate command may initiate the process of method 600 shown in FIG. 6 to be performed by the accessory component. At block 708, the IHS polls the status of the first component to determine at block 710 whether the component is busy. If the component is busy then the method 700 returns to block 708 to again poll the status of the first component. The returned busy status indicates the firmware update is still in progress. When the firmware update process is complete or an error encountered, the first component will return not busy at block 710, at which time the IHS may retrieve a status update at block 712. If that status indicates a failure in the firmware update, the IHS may restart the process of FIG. 7, including re-transmitting the authenticate command of block 706, or perform another recovery technique.

The schematic flow chart diagram of FIG. 3, FIG. 6, and FIG. 7 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc include compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

What is claimed is:

1. A method, comprising:
receiving, by a first component having a first memory storing an original firmware, an instruction from an information handling system coupled to the first component and a second component, wherein the instruction is to verify a firmware payload for the first component stored in a second memory of the second component;
locking, by the first component, the second memory of the second component from modification;
determining, by the first component, whether the firmware payload is verified, wherein the step of determining whether the firmware payload is verified comprises:
instructing, by the first component, the second component to compute a cryptographic hash value for the firmware payload stored in the second memory; and
comparing, by the first component, the cryptographic hash value computed by the second component with an expected hash value for the firmware payload; and
when the firmware payload is verified, updating the first memory with the firmware payload stored in the second memory by overwriting the original firmware.

2. The method of claim 1, wherein the step of receiving the instruction to verify the firmware payload comprises receiving an instruction from a docking component.

3. The method of claim 1, further comprising verifying, by the first component, the firmware payload stored in the first memory after updating the first memory.

4. The method of claim 1, wherein the step of updating the first memory with the firmware payload comprises retrieving the firmware payload from the second memory over a first bus having a lower bandwidth than a second bus used to store the firmware update in the second memory.

5. An apparatus, comprising:
an information handling system;
a first component, the first component having a first memory; and
a second component coupled to the first component through the information handling system, the second component having a second memory,
wherein the second component is configured to perform steps comprising:
receiving, from the information handling system, an instruction to verify a firmware payload for the second component, the firmware payload stored in the first memory of the first component;

locking the first memory of the first component from modification;

determining whether the firmware payload is verified; and when the firmware payload is verified, updating the second memory with the firmware payload stored in the first memory by overwriting an original firmware stored in the second memory, wherein the first component is configured to calculate a cryptographic hash value for the firmware payload after the second component locks the first memory of the first component, and wherein the second component is configured to determine whether the firmware payload is verified by comparing the cryptographic hash value with an expected hash value.

6. The apparatus of claim 5, wherein the second component comprises an embedded controller (EC), and wherein the first component comprises a universal serial bus (USB) device.

7. The apparatus of claim 5, wherein the information handling system is configured to perform steps comprising: storing the firmware payload in the first memory; and sending, to the second component, the instruction to verify the firmware payload after storing the firmware payload in the first memory.

8. The apparatus of claim 5, wherein the first component is coupled to the information handling system through a first bus, and wherein the second component is coupled to the first component through a second bus having a lower bandwidth than the first bus.

9. The apparatus of claim 5, wherein the information handling system is configured to transmit the expected hash value to the second component, wherein the expected hash value is signed with a private key, and wherein the second component is configured to verify the expected hash value with a public key corresponding to the private key.

10. The apparatus of claim 5, verifying, by the first component, the firmware payload stored in the first memory after updating the first memory.

11. The apparatus of claim 5, wherein the first component is coupled to the information handling system (IHS) through a first bus, and wherein the second component is coupled to the information handling system (IHS) through a second bus, and wherein the first bus has a higher data transfer rate than the second bus.

12. An information handling system, comprising:

a first bus coupled to a first component, wherein the information handling system is coupled to a second component through a second bus between the first component and the second component, wherein the information handling system is configured to perform steps comprising:

storing a firmware payload in a first memory attached to the first component, wherein the firmware payload is intended for the second component; and transmitting an authenticate command to the second component, wherein the step of transmitting the authenticate command causes installation of the firmware payload in the second component by causing the second component to:

retrieve the firmware payload from the first component; and determine whether the firmware payload is verified, wherein the step of determining whether the firmware payload is verified comprises:

instructing the first component to compute a cryptographic hash value for the firmware payload stored in the first memory; and comparing the cryptographic hash value computed by the first component with an expected hash value for the firmware payload.

13. The information handling system of claim 12, wherein the first bus has a higher data transfer rate than the second bus.

14. The information handling system of claim 13, wherein the second component comprises an embedded controller (EC), and wherein the first component comprises a universal serial bus (USB) device.

15. The information handling system of claim 12, wherein the information handling system is further configured to perform steps comprising: polling the second component until the second component returns not busy; and retrieving a status update from the second component after the second component returns not busy.

16. The information handling system of claim 15, further comprising repeating the step of transmitting the authenticate command when the status update indicates a failure.

17. The information handling system of claim 12, wherein the information handling system is further configured to perform steps comprising: calculating a cryptographic hash value for the firmware payload; signing the cryptographic hash value with a private key to form an encrypted cryptographic hash value; and transmitting the encrypted cryptographic hash value to the second component, wherein the second component can decode the encrypted cryptographic hash value with a public key corresponding to the private key.

18. The information handling system of claim 12, wherein the second component is configured to perform steps comprising:

receiving an instruction to verify a firmware payload for the first component stored in the first memory of the first component;

locking the first memory of the first component from modification;

determining whether the firmware payload is verified; and when the firmware payload is verified, updating the second memory with the firmware payload stored in the first memory by overwriting an original firmware stored in the second memory.

* * * * *